(12) United States Patent
Hundemer

(10) Patent No.: US 9,043,835 B1
(45) Date of Patent: *May 26, 2015

(54) SYSTEM AND METHOD FOR SIMULTANEOUSLY BROADCASTING MULTIPLE MEDIA-COMPONENTS

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/970,308

(22) Filed: Aug. 19, 2013

Related U.S. Application Data

(63) Continuation of application No. 13/629,468, filed on Sep. 27, 2012, now Pat. No. 8,539,526.

(60) Provisional application No. 61/542,103, filed on Sep. 30, 2011.

(51) Int. Cl.
*H04N 7/10* (2006.01)
*H04N 7/025* (2006.01)
*H04N 7/173* (2011.01)
*H04N 21/61* (2011.01)

(52) U.S. Cl.
CPC ...................................... *H04N 21/61* (2013.01)

(58) Field of Classification Search
None
See application file for complete search history.

(56) References Cited

U.S. PATENT DOCUMENTS

| 7,802,286 | B2 | 9/2010 | Brooks et al. |
| 2001/0032333 | A1 | 10/2001 | Flickinger |
| 2002/0087976 | A1 | 7/2002 | Kaplan et al. |
| 2004/0015986 | A1 | 1/2004 | Carver et al. |
| 2004/0045022 | A1 | 3/2004 | Riedl |
| 2007/0140358 | A1 | 6/2007 | Schwartz et al. |
| 2008/0175148 | A1 | 7/2008 | Todd et al. |
| 2009/0217318 | A1 | 8/2009 | VerSteeg et al. |

OTHER PUBLICATIONS

Disclosures referenced in the accompanying Declaration by Hank J. Hundemer.
Thomson Sapphire MPEG Video Server User Manual, TNM-5100 Series, Aug. 2010.

*Primary Examiner* — Nathan Flynn
*Assistant Examiner* — William J Kim
(74) *Attorney, Agent, or Firm* — McDonnell Boenhnen Hulbert & Berghoff LLP

(57) ABSTRACT

Disclosed herein is a system and method for simultaneously broadcasting video components (VSs). In one example, a method includes an automation-system (AS) selecting a log entry including (i) a first identifier that maps to a first VC, and (ii) a second identifier that maps to a second VC; a recording-and-playout device (RAPD) retrieving the first VC; the RAPD sending the retrieved first-VC to an encoder; the encoder generating a first transport-stream (TS) having (i) program-identification (PID) data, and (ii) payload data including the sent first-VC; the encoder sending the generated first-TS to a first outbound-broadcast device (OBD); the encoder sending the generated first-TS to a transport-stream splicer; the AS loading the splicer with the second VC; the splicer generating a second TS having (i) the PID data of the generated first-TS, and (ii) payload data including the loaded second-VC; and the splicer sending the generated second-TS to a second OBD.

25 Claims, 9 Drawing Sheets

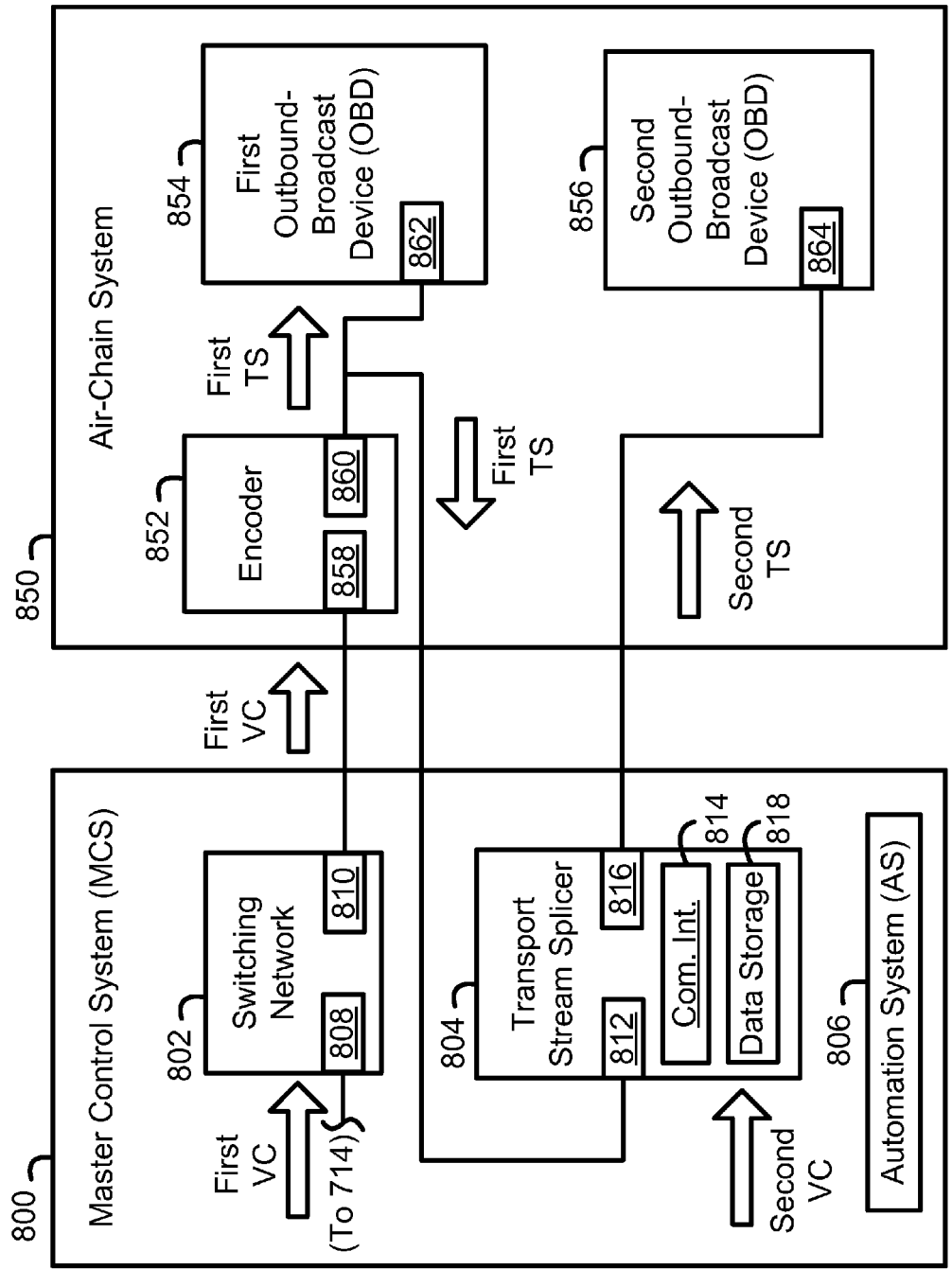

SYSTEM AND METHOD FOR SIMULTANEOUSLY BROADCASTING MULTIPLE MEDIA-COMPONENTS

CROSS REFERENCE TO RELATED APPLICATIONS

This disclosure claims priority to U.S. Provisional Patent Application No. 61/542,103 filed Sep. 30, 2011, which is hereby incorporated by reference herein in its entirety.

This disclosure is also a continuation of co-pending U.S. patent application Ser. No. 13/629,468 filed Sep. 27, 2012.

USAGE AND TERMINOLOGY

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

the term "video" refers broadly to any material represented in a video format (i.e., having a plurality of frames). In some instances, video may include a plurality of sequential frames that are identical or nearly identical, and that may give the impression of a "still" image. Video may or may not include an audio portion.

the term "audio" refers broadly to any material represented in an audio format.

The term "media-component" (MC) refers to video or audio that one of ordinary skill in the art would typically consider to be self-contained, and that is typically separately scheduled by a traffic system in a broadcasting environment.

the term "video-component" (VC) refers to a particular type of MC, namely one that includes video, and that is typically separately scheduled by a traffic system in a television-broadcasting environment. There are several types of VCs, including for example a show-segment VC, such as a six-minute segment of a news program or a five-minute segment of an episode of a sitcom. Another example type of VC is a commercial VC, such as a thirty-second advertisement for a product. Yet another example type of VC is a promotion VC, such as a fifteen-second promotion for a news program.

The term "audio-component" (AC) refers to a particular type of MC, namely one that contains audio, and that is typically separately scheduled by a scheduling traffic system in a radio-broadcasting environment. Similar to a VC, there are several types of ACs, including for example a show-segment AC, such as a six-minute segment of a news program. Another example type of AC is a commercial AC, such as a thirty-second advertisement for a product. Yet another example type of AC is a promotion AC, such as a fifteen-second promotion for a news program.

TECHNICAL FIELD

The presently disclosed system and method relates to broadcasting technology, inducing for example, television-broadcasting and radio-broadcasting technology.

BACKGROUND

In the field of television broadcasting, traffic systems are software and/or hardware packages that may be used, among other things, to schedule and sequence VCs intended for broadcast (e.g., over the air). To schedule VCs, a traffic manager may interact with a traffic system to create a traffic log ("log"). A log may indicate which VCs are intended to be broadcast during a particular time span, and further may indicate when each VC is intended to be broadcast. A log may include multiple log entries, with each log entry corresponding to one VC and scheduling data for that VC. The log therefore may represent the sequence of VCs intended to be broadcast during the time span.

A traffic system typically communicates with a master control system (MCS), which is the technical hub of a broadcast operation and is the final point before a VC is sent to an air-chain system for broadcast. More specifically, the traffic system typically communicates with a master-control automation-system (AS) of the MCS. The AS is the logic center of the MCS and may cause the MCS and/or another entity to perform various functions. Through a communication path, the traffic system may provide the log to the AS, such that the AS may traverse and select log entries according to their corresponding scheduling data. The AS may then cause the MCS and/or another entity to perform certain functions corresponding to each selected log entry. Such functions typically include the MCS retrieving from a data storage the VC corresponding to the log entry, channeling the VC through one or more entities within the MCS (e.g., through one or more switches), and sending the VC to an air-chain system for broadcast.

SUMMARY

Disclosed herein is a system and method for simultaneously broadcasting multiple video components (VC). In one example, a method involves (i) a master-control automation-system (AS) selecting a log entry from a television-broadcast traffic-log, the log entry including (a) a first identifier that maps to a first VC and (b) a second identifier that maps to a second VC; (ii) responsive to the AS selecting the log entry, a recording-and-playout device (RAPD) retrieving the first VC; (iii) the RAPD sending the retrieved first-VC to an encoder; (iv) the encoder generating a first transport-stream (TS) having (a) program-identification (PID) data, and (b) payload data including the sent first-VC; (v) the encoder sending the generated first-TS to a first outbound-broadcast device (OBD) for television-broadcast; (vi) the encoder sending the generated first-TS to a transport-stream splicer; (vii) responsive to the AS selecting the log entry, the AS loading the splicer with the second VC; (viii) the splicer generating a second TS having (a) the PID data of the generated first-TS, and (b) payload data including the loaded second-VC; and (ix) the splicer sending the generated second-TS to a second OBD for television-broadcast, simultaneously while the encoder sends the generated first-TS to the first OBD.

In another example, a method involves (i) selecting a log entry from a television-broadcast traffic-log, the log entry including (a) a first identifier that maps to a first VC and (b) a second identifier that maps to a second VC; (ii) generating a first TS having (a) PID data, and (b) payload data including the first VC; (iii) sending the generated first-TS to a first OBD for television-broadcast; (iv) generating a second TS having (a) the PID data of the generated first-TS, and (b) payload data including the second VC; and (v) sending the generated second-TS to a second OBD for television-broadcast, simultaneously while sending the generated first-TS to the first OBD.

In another example, a television-broadcasting system includes (i) a RAPD; (ii) a switching network; (iii) an encoder, wherein the RAPD is connected to the encoder via the switching network; (iv) a first OBD connected to the encoder; (v) a transport-stream splicer connected to the encoder; (vi) a second OBD connected to the splicer; and (vii) an AS connected to the RAPD, the switching network, and the splicer.

In the example system, the AS is configured to (i) select a log entry from a television-broadcast traffic-log, the log entry including (a) a first identifier that maps to a first VC and (b) a second identifier that maps to a second VC, and (ii) responsive to selecting the log entry, cause (a) the RAPD to retrieve the first VC, and (b) load the splicer with the second VC. In the example system, the RAPD is configured to send the retrieved first-VC to the encoder;

In the example system, the encoder is configured to (i) generate a first TS having (a) PID data, and (b) payload data including the sent first-VC, (ii) send the generated first-TS to the first OBD for television-broadcast, and (iii) send the generated first-TS to the splicer.

In the example system, the splicer is configured to (i) generate a second TS having (a) the PID data of the generated first-TS, and (b) payload data including the loaded second-VC; and (ii) send the generated second-TS to the second OBD for television-broadcast, simultaneously while the encoder sends the generated first-TS to the first OBD.

In another example, a method involves (i) an AS selecting a log entry from a radio-broadcast traffic-log, the log entry including (a) a first identifier that maps to a first audio-component (AC) and (b) a second identifier that maps to a second AC; (ii) responsive to the AS selecting the log entry, a RAPD retrieving the first AC; (iii) the RAPD sending the retrieved first-AC to an encoder; (iv) the encoder generating a first data-stream (DS) including the sent first-AC; (v) the encoder sending the generated first-DS to a first OBD for radio-broadcast; (vi) the encoder sending the generated first-DS to a transport-stream splicer; (vii) responsive to the AS selecting the log entry, the AS loading the splicer with the second AC; (viii) the splicer generating a second DS that maintains the continuity of the generated first DS, and that includes the loaded second DS; and (ix) the splicer sending the generated second-TS to a second OBD for radio-broadcast, simultaneously while the encoder sends the generated first-TS to the first OBD.

In another example, a method involves (i) an AS selecting a log entry from a traffic-log, the log entry including (a) a first identifier that maps to a first VC and (b) a second identifier that maps to a second VC; (ii) responsive to the AS selecting the log entry, a RAPD retrieving the first VC; (iii) the RAPD sending the retrieved first-VC to an encoder; (iv) the encoder generating a first TS having (i) PID data, and (ii) payload data including the sent first-VC; (v) the encoder sending the generated first-TS to a first OBD for broadcast; (vi) the encoder sending the generated first-TS to a transport-stream splicer; (vii) responsive to the AS selecting the log entry, the AS loading the splicer with the second VC; (viii) the splicer generating a second TS having (a) the PID data of the generated first-TS, and (b) payload data including the loaded second-VC; and (ix) the splicer sending the generated second-TS to a second OBD for broadcast, simultaneously while the encoder sends the generated first-TS to the first OBD.

BRIEF DESCRIPTION OF THE DRAWINGS

FIG. 8 is a simplified block diagram of another example master control system and another example air-chain system.

DETAILED DESCRIPTION OF THE DRAWINGS

I. Overview

Figure 1:
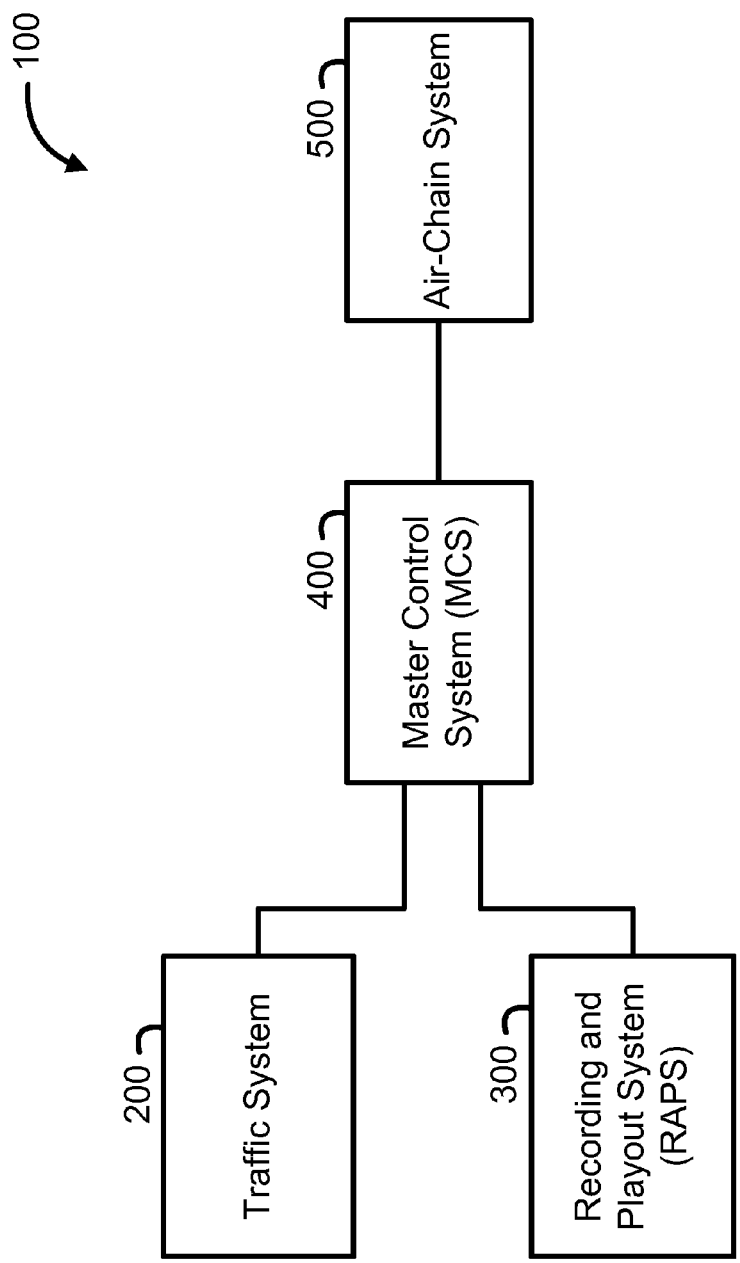
FIG. 1 is a simplified block diagram of an example television-broadcasting system.

In the television-broadcasting industry, traffic systems are provided by multiple vendors, and often include distinguishing features. However, for a variety of reasons such as to provide compatibility, many traffic systems create logs according to a general industry-wide standard. Likewise, many ASs are configured to receive logs based on this standard. A log entry based on this standard typically includes certain attributes. These attributes may be generated automatically (e.g., by the traffic system) or may be provided by a traffic manager.

One such attribute is a house number, which identifies the VC that corresponds to the log entry. Typically, the house number is a unique identifier within a broadcasting system, and maps to a file location in a data storage where the VC is stored. As such, by obtaining the house number, the AS may use a mapping table to determine the corresponding file location, and may then retrieve the VC stored in that file location. Two examples of well-known traffic systems that use house numbers in this manner include WO Traffic provided by WideOrbit Inc. of San Francisco, Calif., and OSi-Traffic™ provided by Harris Corporation of Melbourne, Fla.

Additional common attributes based on this standard include those relating to scheduling data. For example, a log entry may have a start time that represents the intended start time for the corresponding VC, and a duration that represents the duration of the corresponding VC.

Still additional common attributes based on this standard include a title, an episode number, a segment number, and one or more auxiliary values. The title provides a description of the corresponding VC. The episode number identifies a particular episode of a show, and is included in a log entry that corresponds to a show-segment VC. The segment number identifies a particular segment number of a show, and is included in a log entry that corresponds to a show-segment VC. The one or more auxiliary values are typically used for notes (e.g., such that a traffic manager may provide a note to a master control operator about the corresponding log entry).

The above-described attributes are stored within corresponding fields in the log entry. For example, the house number is stored in a house-number field in the log entry. Likewise, the one or more auxiliary values are stored in one or more auxiliary-value fields in the log entry.

Once the VC is retrieved, the VC may be channeled through one or more entities within the MCS (e.g., through one or more switches), and sent to an air-chain system for broadcast (e.g., over the air or over Internet Protocol (IP)). An air-chain system typically includes an encoder and one or more outbound-broadcast devices (OBD) (e.g., a transmitter, a satellite, or a terrestrial fiber transmitter), each corresponding to a different service provider. As such, a television-broadcasting system may be configured to broadcast one VC to users of different service providers simultaneously.

While broadcasting a single VC to multiple users is common in the broadcasting industry, in some instances, there may be an exception where it is desired to broadcast multiple VCs simultaneously, each to a different group of users based on their service provider. For example, consider a cable-television provider A who produces a commercial VC that promotes a low, introductory rate for users who sign-up with the provider A. Consider further that the provider A purchases a commercial spot from a broadcasting company whose system broadcasts video simultaneously to an OBD A corresponding to the provider A, and to an OBD B corresponding to a cable provider B, a competitor of provider A. In this example, the provider A likely wants the commercial VC to broadcast to users of provider B (to encourage those users to change providers). However, the provider A likely does not want the commercial VC to broadcast to its own users who may be upset to learn that they are paying more than the introductory rate. Instead, the provider A may want to broadcast a different commercial VC to these users (e.g., one that promotes a bundle offer for television, phone, and Internet services).

In one example, a television-broadcasting system may be configured to simultaneously broadcast two VCs in this manner by essentially combining two television-broadcasting systems (or at least substantial portions thereof) into one system. However, the additional entities needed for such a system (e.g., bypass switchers and encoders) are expensive. Further, given that a log entry typically includes only one house number, retrieving and simultaneously broadcasting multiple VCs requires a user to continually monitor and manually configure the system as appropriate. For example, a user may need to manually retrieve the second VC and further may need to manually change the input-to-output mappings on one or more bypass switchers at appropriate times such that both the first and second VCs are broadcast to the desired users.

In one aspect of the presently disclosed system and method, an identifier in an auxiliary-value field in a log entry may be used to facilitate the simultaneous broadcast of two VCs. By leveraging the auxiliary-value field of a log entry to provide the functionality described above, the presently disclosed method may be implemented in a system that includes or is configured for use with many existing traffic systems. This is particularly advantageous given the wide-spread use of auxiliary-value fields in traffic systems. Further, the use of a transport-stream splicer, among other things, in the system may reduce or eliminate the need for select entities (e.g., bypass switchers and encoders) that may be used in other systems as discussed above.

II. Example Television-Broadcasting System Using Two Bypass Switchers and Two Encoders FIG. 1 shows an example television-broadcasting system, generally designated 100. The system 100 includes a traffic system 200, a RAPS 300, a MCS 400, and an air-chain system 500. The MCS 400 may serve as the hub of the television-broadcasting system 100 and may connect to each of the traffic system 200, the RAPS 300, and the air-chain system 500. Generally, the system 100 may be configured such that video may be sent from the RAPS 300, through the MCS 400, and to the air-chain system 500 for television broadcast. As described in greater detail below, the MCS 400 uses two bypass switchers and the air-chain system 500 uses two encoders, such that the system 100 may simultaneously broadcast two VCs.

A. Traffic System

Figure 2:
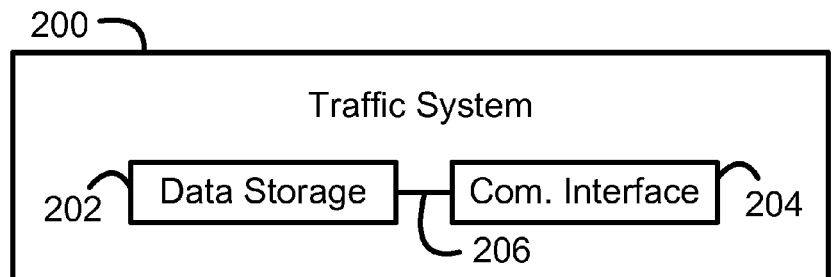
FIG. 2 is a simplified block diagram of an example traffic system.

FIG. 2 shows the traffic system 200 in greater detail. The traffic system 200 may be configured for creating and sending a traffic log to the MCS 300, and may include a data storage 202 and a communication interface 204, both of which may be connected to each other by a connection mechanism (e.g., a system bus) 206. The traffic system 200 may be configured to store traffic logs in the data storage 202, and send the stored traffic logs, via the communication interface 204, to the MCS 300. As discussed above, two example traffic systems are WO Traffic provided by WideOrbit Inc. of San Francisco, Calif., and OSi-Traffic™ provided by Harris Corporation of Melbourne, Fla.

B. RAPS

Figure 3:
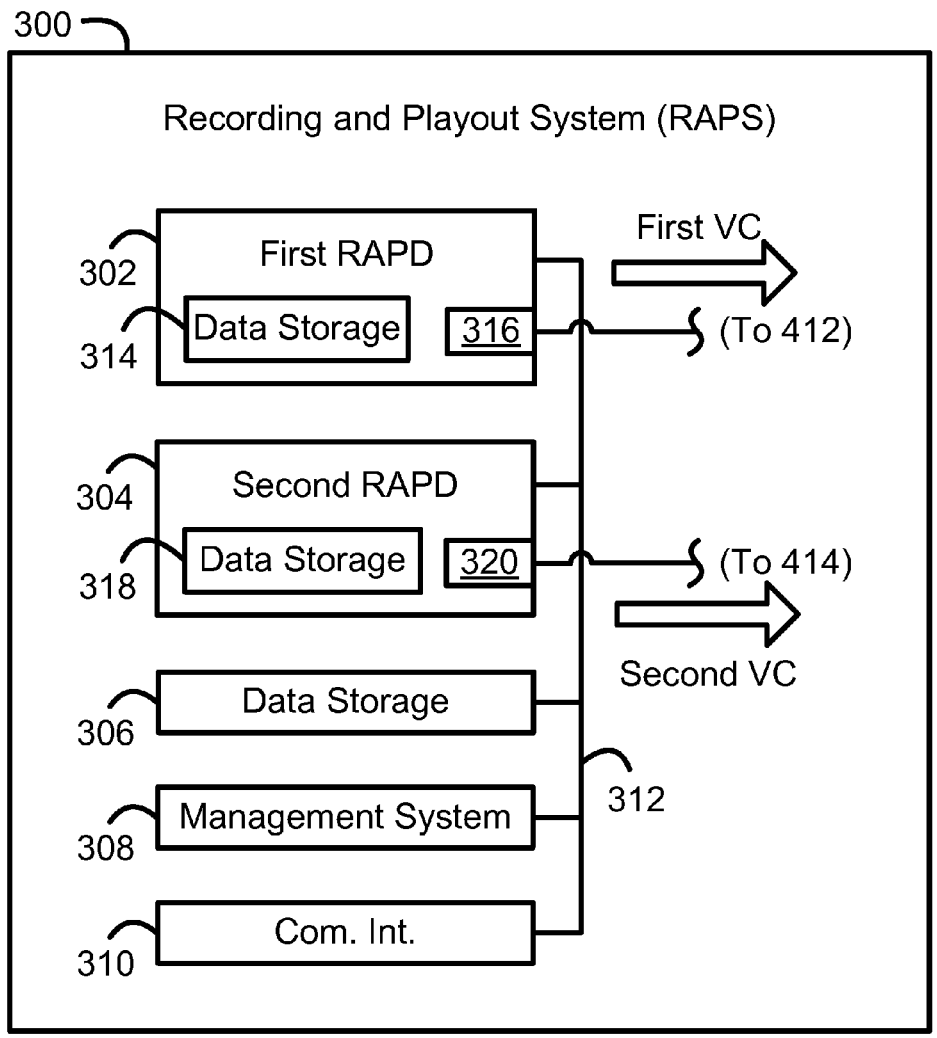
FIG. 3 is a simplified block diagram of an example recording-and-playout system.

FIG. 3 shows the RAPS 300 in greater detail. The RAPS 300 may be configured to manage and organize VCs. The RAPS 300 may include a first RAPD 302, a second RAPD 304, a data storage 306, a management system 308, and a communication interface 310, each of which may be connected to each other by a connection mechanism 312.

The RAPDs 302, 304 may be configured to record VCs (e.g., a VC retrieved from the data storage 306) and playout (i.e. send) VCs, via the MCS 400, to the air-chain system 500. The first RAPD 302 may include a data storage 314 and an output 316, both of which may be connected to each other by a connection mechanism (not shown). The data storage 314 may be used for storing VCs that may be sent via the output 316. Likewise, the second RAPD 304 may include a data storage 318 and an output 320, both of which may be connected to each other by a connection mechanism (not shown). The management system 308 may be configured to manage the RAPDs 302, 304 by organizing and moving VCs back-and-forth between the RAPDs and the data storage 306. The communication interface 310 may connect the RAPS 300 to the MCS 400 or to another entity. An example of a RAPD is the K2 server provided by Grass Valley™ of San Francisco, Calif.

C. MCS

Figure 4:
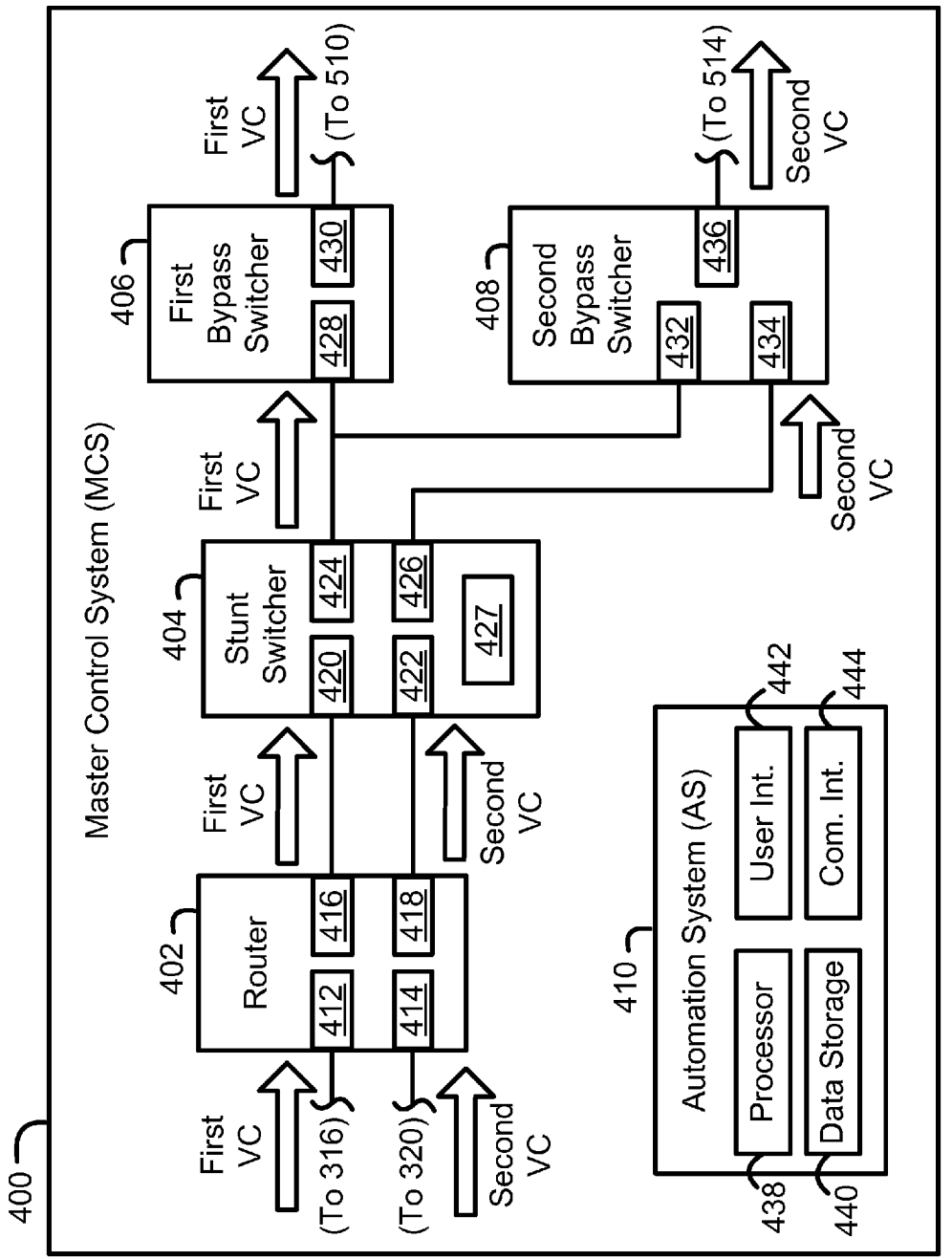
FIG. 4 is a simplified block diagram of an example master control system.

FIG. 4 shows the MCS 400 in greater detail. The MCS 400 may be configured to receive a VC sent from one of the RAPDs 302, 304, channel the VC though one or more entities, and send the VC to the air-chain system 500 for television broadcast. In one example, the MCS 400 includes a router 402, a stunt switcher 404, a first bypass switcher 406, a second bypass switcher 408, and an AS 410, each of which may be connected to each other by a connection mechanism (not shown).

The router 402 may be configured to map two or more source entities to two or more destination entities, and may include two or more inputs, including a first input 412 and a second input 414, and two or more outputs, including a first output 416 and a second output 418. The inputs 412, 414, and the outputs 416, 418 may each be connected to each other by a connection mechanism (not shown).

The first RAPD 302 may be connected to the router 402 via the output 316 and the input 412. The second RAPD 302 may be connected to the router 402 via the output 320 and the input 414. In some instances, the router 402 may be connected, via the inputs 412, 414, to another source entity (e.g., a satellite or a newsroom production control system). An example of a router is the Blackmagic Design Videohub provided by Blackmagic Design Pty. Ltd. of Fremont, Calif.

The stunt switcher 404 may be configured to map a source entity to a destination entity, and may include two or more inputs, including a first input 420, and a second input 422, and two or more outputs, including a first output 424 and a second output 426. The stunt switcher may also include a data storage 427. The inputs 420, 422, the outputs 424, 426, and the data storage 427 may each be connected to each other by a connection mechanism (not shown).

The router 402 may be connected to the stunt switcher 404 via the output 416 and the input 420. The router may also be connected to the stunt switcher 404 via the output 418 and the input 422. The stunt switcher 404 may also be configured to provide graphical overlay and other video effects (sometimes referred to as "stunt work" or "digital video effects") to a received VC before it is sent out. The stunt switcher may store effect data in the data storage 427. An example of a stunt switcher is the Miranda NVISION NVS5100MC provided by NVision, Inc. of Coppell, Tex.

The bypass switchers 406, 408 each may be configured to map a source entity to a destination entity. The first bypass switcher 406 may include an input 428 and an output 430, both of which may be connected to each other by a connection mechanism (not shown). The stunt switcher 404 may be connected to the first bypass switcher 406 via the output 424 and the input 428.

The second bypass switcher 408 may include at least two inputs including a first input 432 and a second input 434, and an output 436, each of which may be connected to each other by a connection mechanism (not shown). The stunt switcher 404 may be connected to the second bypass switcher 408 via the output 424 and the input 432. In one example, a splitter (not shown) may be used such that the stunt switcher 404 may connect to both the first bypass switcher 406 and the second bypass switcher 408. The stunt switcher 404 may also be connected to the second bypass switcher 408 via the output 426 and the input 434. An example of a bypass switcher is the X-1202H switcher provided by Evertz Microsystems, Ltd. of Burlington, Ontario, Canada.

Accordingly, provided that the router 402, the stunt switcher 404, and the first bypass switcher 406 all have the appropriate input-to-output mappings, a first VC send from the first RAPD 302 to the MCS 400 may be channeled through the entities in the MCS and sent out the MCS. Likewise, provided that the router 402, the stunt switcher 404, and the second bypass switcher 408 all have the appropriate input-to-output mappings (including the input 434 being mapped to the output 436), a second VC sent from the second RAPD to the MCS 400 may be channeled through the entities in the MCS and sent out the MCS 400.

The AS 410 may be configured to perform or to cause performance of one or more functions related to the system 100. The AS 410 may include a processor 438, a data storage 440, a user-interface 442, and a communication interface 444, all of which may be connected by a connection mechanism (not shown). The processor 438 may include one or more general-purpose processors (e.g., microprocessors) and/or special-purpose processors (e.g., digital signal processors and/or application specific integrated circuits).

The data storage 440 may include one or more volatile and/or non-volatile storage components and may be integrated in whole or in part with the processor 438. The data storage 440 may take the form of a non-transitory computer-readable medium and may contain program instructions, that when executed by the processor 438, cause performance of one or more functions. For example, the AS 410 may cause the traffic system 200, the RAPS 300, the MCS 400, the air-chain system 500, an entity included therein, and/or another entity to perform one of more of the functions described in this disclosure. The AS 410 may cause such functions to be performed by sending instructions and/or other data via a communication interface and/or a connection mechanism. The AS 410 may receive data via the same path. In one example, the AS 410 sends and receives data via a video disk control protocol (VDCP).

D. Air-Chain System

Figure 5:
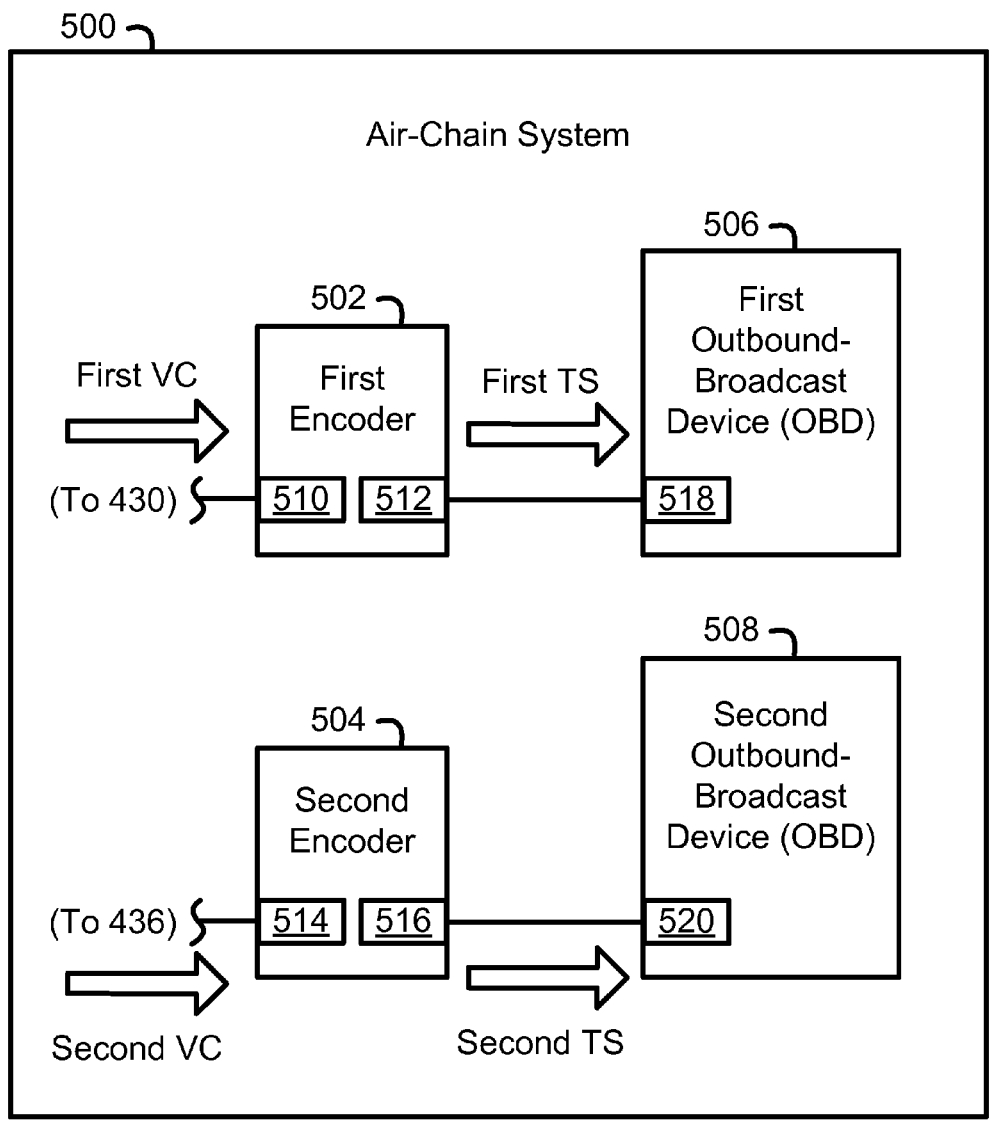
FIG. 5 is a simplified block diagram of an example air-chain system.

FIG. 5 shows the air-chain system 500 in greater detail. The air-chain system 500 may be configured to prepare and broadcast the first VC received from the MCS 400 to a first group of users, and to prepare and broadcast the second VC received from the MCS 400 to a second group of users. The air-chain system 500 may include a first encoder 502, a second encoder 504, a first OBD 506, and a second OBD 508.

Each encoder 502, 504 may be configured to receive a VC from a source entity, generate a transport stream (TS), and send the generated TS to a destination entity. The TS may be described as including the VC, meaning that the TS includes the encoded representation of the VC, among other things. The first encoder 502 may include an input 510 and an output 512, each of which may be connected by a connection mechanism (not shown). The first bypass switcher 406 may be connected to the first encoder 502 via the output 430 and the input 510. Likewise, the second encoder 504 may include an input 514 and an output 516, each of which may be connected by a connection mechanism (not shown). The second bypass switcher 408 may be connected to the second encoder 504 via the output 436 and the input 514.

In one example, each of the encoders 502, 504 may generate a TS by, among other things, encoding video based on the high-definition serial-digital-interface (HD-SDI) standard to video based on the MPEG 2 standard. Typically, a TS includes at least two portions, namely program identification (PID) data and payload data. In one example, a TS is a stream of 188-byte packets where each packet includes 13-bits of PID data, with the remaining portion being payload data. In each packet, the PID data may be described as a label for the payload data, the latter including, for example, encoded audio or encoded video. Typically, the payload data of a packet having a globally recognizable label (e.g., "0000" PID data), points to a table-of-contents (TOC) that associates PID data with a type of payload data. For example, the TOC may indicate that a packet with "1234" PID data includes as payload data, encoded video for a multi-cast channel 0.1, and that a packet with "1235" PID data includes as payload data, encoded video for a multi-cast channel 0.2. Both the PID data and the payload data may be created by an encoder as it generates a TS. A PSIP generator connected to the encoder may be used to tell the encoder what PID data should be used for each packet. An example of an encoder is the NetVX provided by Harris Corporation of Melbourne, Fla.

Each OBD 506, 508 may be configured to receive a TS from a source entity, and broadcast the TS (i.e., including a VC) to multiple destination entities. The first OBD 506 may include an input 518 and the first encoder may be connected to the first OBD via the input 518. Likewise, the second OBD 508 may include an input 520 and the second encoder 504 may be connected to the second OBD via the input 520.

Each OBD 506, 508 may be a transmitter, satellite, terrestrial fiber transmitter, or network connection (e.g., for an Internet feed) that may correspond with a service provider. For example, the OBD 506 may broadcast a first TS (including the first VC) to a group of users associated with the service provider A, and the second OBD 508 may broadcast a second TS (including the second VC) to a group of users associated with the service provider B.

As shown, the system 100 may be configured to simultaneously broadcast the first VC and the second VC. However, by modifying the input-to-output mapping on the second bypass switcher 408 (i.e., such that the input 432, rather than the input 434, maps to the output 436), the first VC may be sent to both of the encoders 502, 504, and therefore both OBDs 506, 508. Notably, in this configuration, the second RAPD 304 need not send the second VC to the MCS 400 as the first VC is ultimately sent to both of the OBDs 506, 508.

As noted above, each log entry typically includes a single house number. Therefore, while the AS may cause the first RAPD 302 to retrieve the first VC based on a log entry, a master control operator or other user typically needs to cause the second RAPD 304 to retrieve the second VC if simultaneous broadcasting of VCs is desired. Further, the user typically needs to manually modify the input-to-output mapping on the second bypass switcher 408 at the appropriate time (e.g., when the first and second VCs are intended to be simultaneously broadcast) such that the second VC (rather than the first VC) is sent to the second OBD 508. Likewise, the user typically needs to again modify the input-to-output mapping of the second bypass switcher 408 once the first and second VCs have been simultaneously broadcast to return to the configuration in which a single VC is sent to the OBDs 506, 508. Typically, the user performs these manual operations in response to a special request from the traffic manager (e.g., based on a written note).

Figure 6:
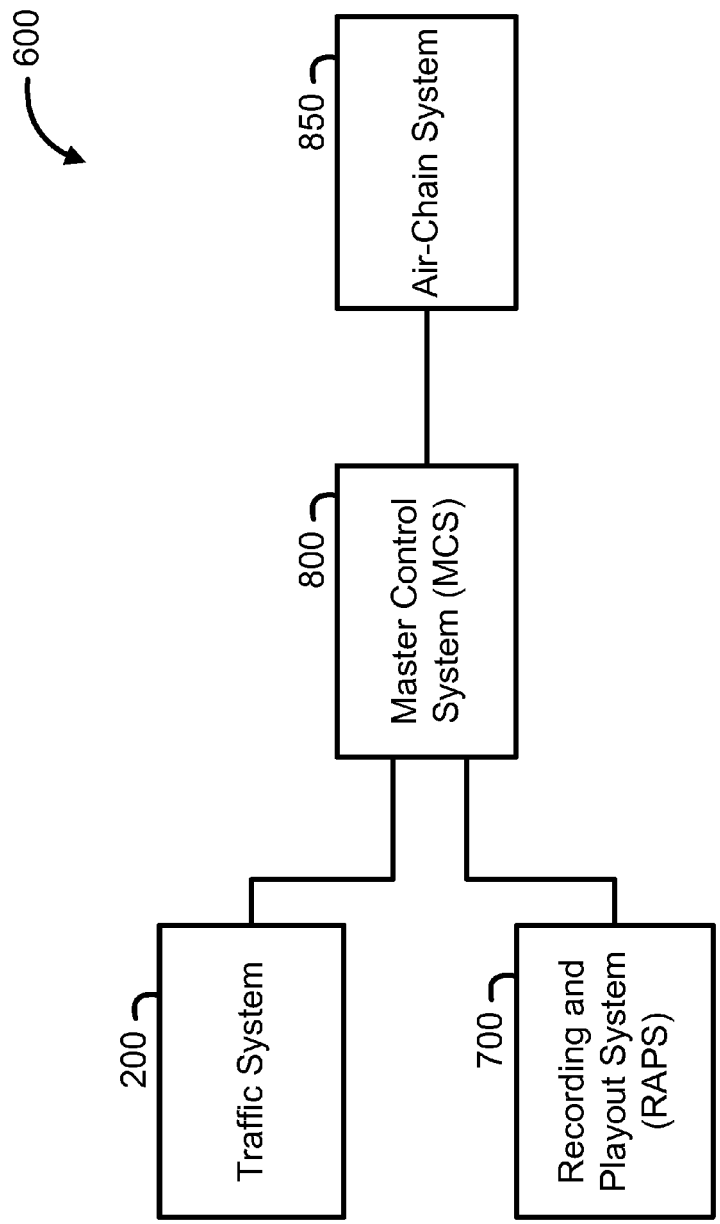
FIG. 6 is a simplified block diagram of another example television-broadcasting system.

III. Example Television-Broadcasting System Using a Transport-Stream Splicer FIG. 6 shows another example television-broadcasting system, generally designated 600. As described in greater detail below, the system 600 uses a transport-stream splicer, among other things, to simultaneously broadcast two VCs. This may reduce or eliminate the need for two bypass switches and two encoders (as described above) to provide such functionality. The system 600 may include the traffic system 200 of the system 100, but a modified RAPS 700, MCS 800 and air-chain system 850 (as compared to the RAPS 300, the MCS 400 and the air-chain system 500).

Figure 7:
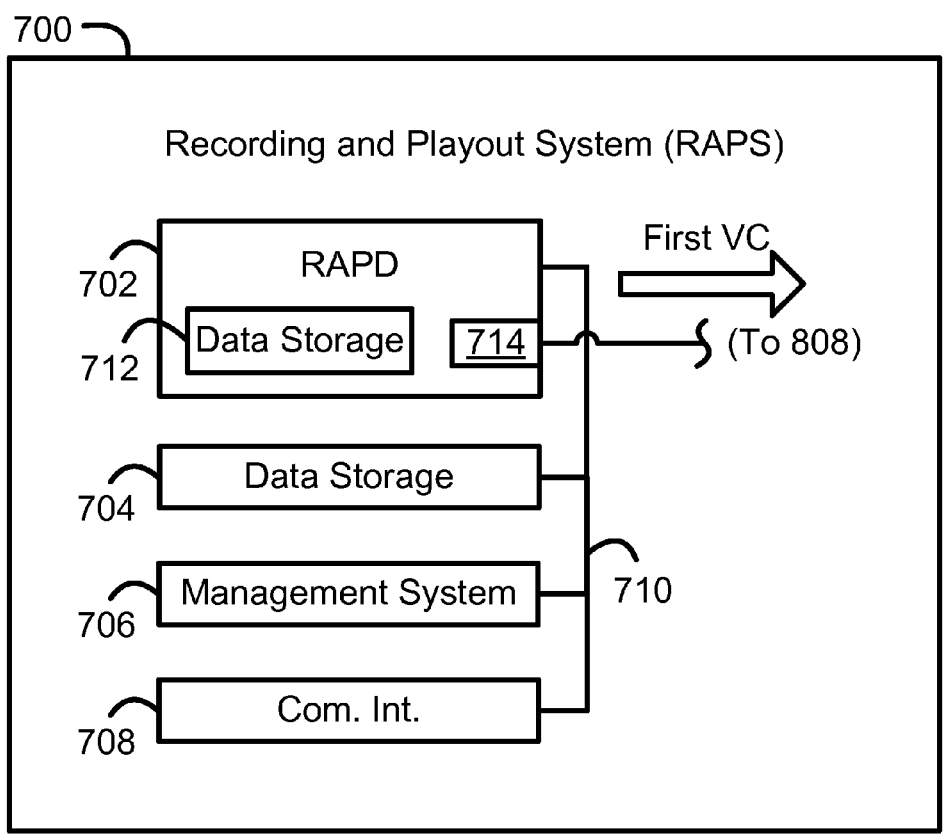
FIG. 7 is a simplified block diagram of another recording-and-playout system.

FIG. 7 shows the RAPS 700 in greater detail. The RAPS 700 include a RAPD 702, a data storage 704, a management system 706, and a communication interface 708, each of which may be connected to each other via a connection mechanism 710. The RAPD 702 may include a data storage 712 and an output 714, both of which may be connected to each other via a connection mechanism (not shown).

FIG. 8 shows the MCS 800 and the air-chain system 850 in greater detail. The MCS 800 may include a switching network 802, a transport-stream splicer 804, and an AS 806, each of which may be connected to each other via a connection mechanism (not shown). The air-chain system 750 may include an encoder 852, a first OBD 852, and a second OBD 854.

In the MCS 800, the switching network 802 may be configured to map one or more source entities to one or more destination entities. The switching network 802 may include an input 808, and an output 810. In one example, the switching network 802 includes a router, a stunt switcher, and a bypass switcher, all of which may be configured in a same or similar manner as those discussed above in connection with the MCS 400 (although notably there is no need for a second bypass switcher as used in the MCS 400). As such, the input 808 may be an input of a router, the output 810 may be an output of a bypass switcher, and the router and the bypass switcher may be connected by a stunt switcher.

The RAPD 702 may be connected to the switching network 802 via the output 714 and the input 808. The encoder 852 may include an input 858 and an output 860, both of which may be connected to each other via a connection mechanism. The switching network 802 may be connected to the encoder 852 via the output 810 and the input 858. The first OBD 854 may include an input 862, and the encoder 852 may be connected to the first OBD via the output 860 and the input 862.

The splicer 804 may be configured to generate a TS that combines a portion of an existing TS with video. The splicer 804 may include an input 812, a communication interface 814, an output 816, and a data storage 818, each of which may be connected to each other via a connection mechanism (not shown). The encoder 852 may be connected to the splicer 804 via the output 860 and the input 812. A splitter (not shown) may be used such that the encoder 852 may connect to both the first OBD 854 and the splicer 804. The data storage 818 may be used to store video (e.g., a VC retrieved via the communication interface 814 and from the data storage 704). The splicer 804 may use the stored video, together with a first TS received via the input 812 to generate a second TS that may be sent from the splicer 804 to the second OBD 856 (via the output 816 and an input 864 of the second OBD) for broadcast to a second group of users.

In generating the second TS, the splicer 804 may parse the first TS and separate its PID data and its payload data (including the first VC). The splicer 804 may maintain the PID data, but replace the payload data (including the first VC) with new payload data (representing the second VC). This allows the second TS to be sent directly to an OBD for broadcast (i.e., no additional encoder is needed). An example of a splicer is the Sapphire Transport Stream Server provided by Thomson Video Networks of Southwick, Mass.

In one example, the AS 806 is configured in a same or similar manner as the AS 410 discussed above in connection with the MCS 400, but for use with the system 600. As such, the AS 806 may be configured to perform or to cause performance of one or more functions related to the system 600.

Provided that entities in the switching network 802 have the appropriate input-to-output mappings, the first VC played out by the RAPD 702 and sent to the MCS 800 may be channeled through the switching network 802 and sent to the encoder 852 such that the encoder may generate a first TS (that includes the first VC) and may send the generated first TS to the first OBD for broadcast to a first group of users. Further, provided that a second VC is stored in the data storage 818, the splicer 804 may generate a second TS (that includes the second VC) and send it to the second OBD 856 for broadcast to a second group of users, simultaneously while the first TS is being sent to the first OBD 854 for broadcast to the first group of users.

The systems 100, 600 described above are non-limiting example. Indeed, the presently disclosed system may include some or all of the entities discussed above, and may be arranged in different ways as would be apparent to one of ordinary skill in the art. As one example, in the MCS 400, the router 402 may be connected directly to the bypass switcher 406 (i.e., omitting the stunt switcher 404). As another example, the data storage 704 and the management system 706 may be included in the MCS 700, rather than in the RAPS 700.

III. Example Methods

Figure 9A:
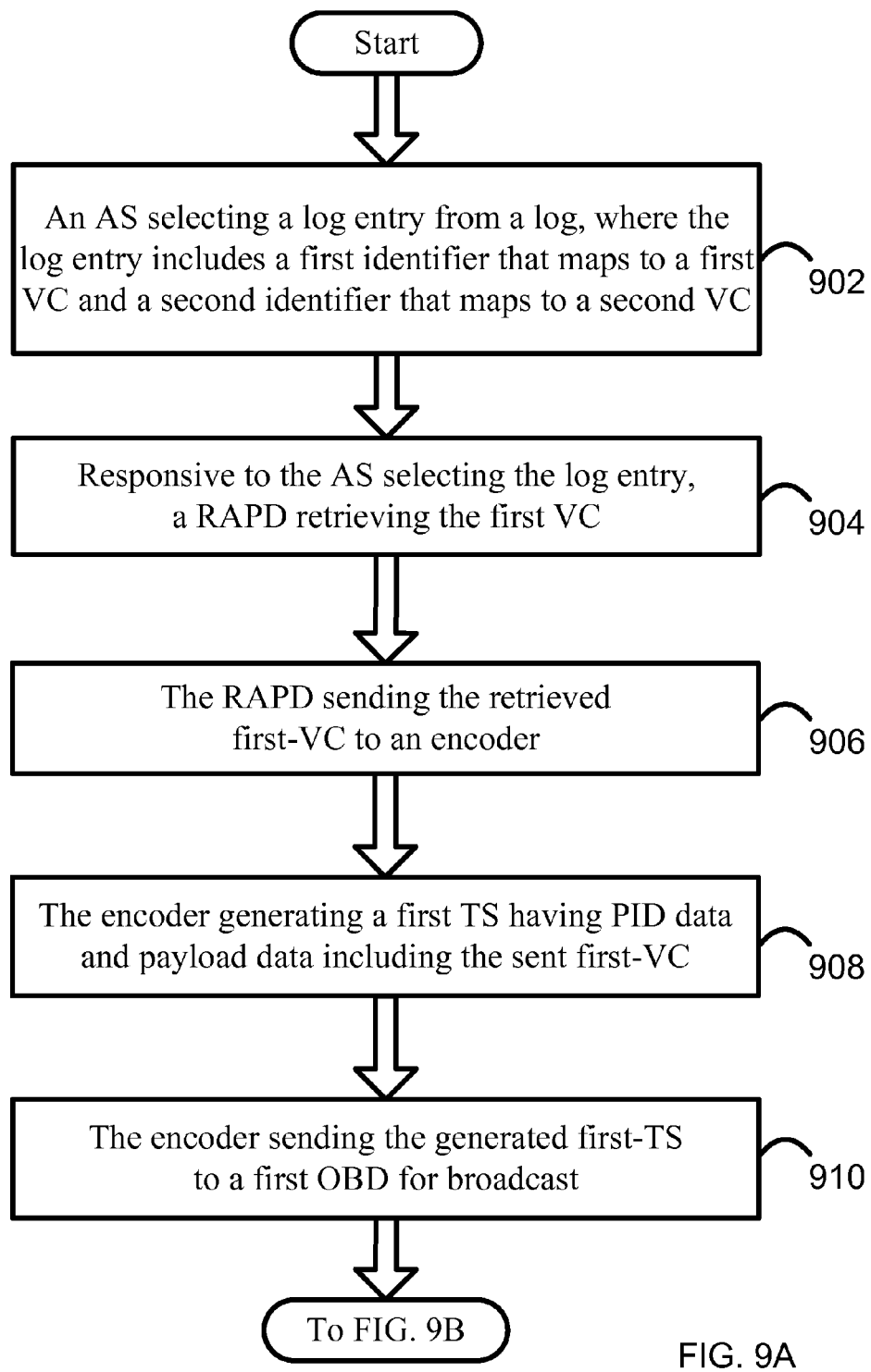
FIG. 9A shows a first part of a flow chart illustrating functions in accordance with an example method.
Figure 9B:
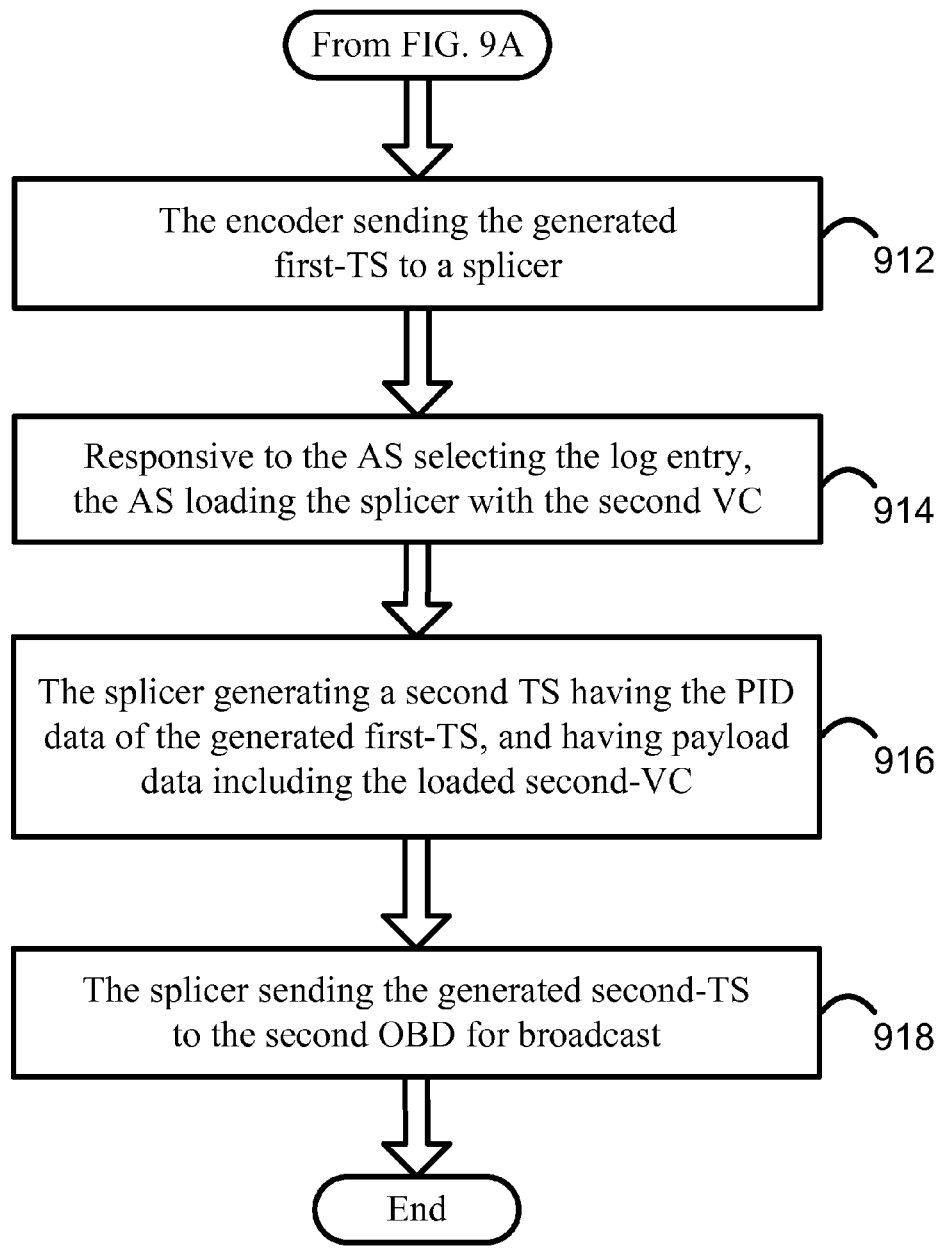
FIG. 9B shows a second part of the flow chart of FIG. 9A.

FIGS. 9A and 9B show a flow chart illustrating functions in accordance with an example method for simultaneously broadcasting two VCs. The functions may be logically grouped into sets, one for each of the two VCs being broadcast simultaneously.

A. Broadcasting a First VC to a First OBD

At block 902, the method may involve the AS 806 selecting a log entry from a log, where the log entry includes a first identifier that maps to a first VC and a second identifier that maps to a second VC. In one example, the first identifier is included in a house-number field of the selected log-entry, and the second identifier is included in an auxiliary-value field of the selected log-entry. In one example, the AS 806 may select an entry from a log as the AS 806 traverses the log. As discussed above, the AS 806 may traverse entries of a log based on the scheduling data included in the log entries. As such, the selected log entry refers to a particular entry that is "current" in the traversal.

At block 904, the method may involve responsive to the AS 806 selecting the log entry, the RAPD 702 retrieving the first VC. For example, the RAPD 702 may retrieve the first VC from the data storage 704.

At block 906, the method may involve the RAPD 702 sending the retrieved first-VC to the encoder 852. In one example, the RAPD 702 sends the retrieved first-VC to the encoder 852 via the switching network 802 (e.g., via a router, stunt switcher, and bypass switcher, each having appropriate input-to-output mappings).

At block 908, the method may involve the encoder 852 generating a first TS having PID data and payload data including the sent first-VC.

At block 910, the method may involve the encoder 852 sending the generated first-TS to the first OBD 854 for broadcast.

B. Broadcasting a Second VC to a Second OBD

As noted above, in addition to broadcasting the first VC, the second VC may be simultaneously broadcast. At block 912, the method may involve the encoder 852 sending the generated first-TS to the splicer 804 (e.g., via the output 860 and the input 812).

At block 914, the method may involve responsive to the AS 806 selecting the log entry, the AS 806 loading the splicer 804 with the second VC. For example, the AS 806 may load the splicer 804 with the second VC by copying the second VC from the data storage 706 to the data storage 818 via the communication interface 814 and using a file-transfer protocol (FTP).

At block 916, the method may involve the splicer 804 generating a second TS having the PID data of the generated first-TS, and having payload data including the loaded second-VC. For example, the splicer 804 may generate the second TS based on the first TS received via the input 812 and the loaded second-VC stored in the data storage 818.

At block 918, the method may involve the splicer 804 sending the generated second-TS to the second OBD 856 for broadcast.

Among other things, the example method reduces or eliminates the need for a user to manually monitor and configure the system to simultaneously broadcast VCs. Indeed, based on the identifiers in the log entry, the AS 806 may seamlessly cause multiple VCs to be simultaneously broadcast such as by performing the functions discussed above. Further, such functionality may be provided by the system 600 that does not require multiple bypass switchers or multiple encoders as discussed above in connection with the example system 100.

C. Timing

While the functions described above have been logically grouped into two sets (i.e., one for each of the two VCs being simultaneously broadcast), the functions need not be performed in the order recited. Indeed, in one example, the AS 806 may select a log entry before the scheduled start time corresponding to the log entry such that the AS may perform select functions in advance as needed. This may ensure that the system 600 is properly prepared to broadcast each of the two VCs at the scheduled start time.

For instance, the AS 806 may select a log entry several hours before the corresponding scheduled start time. Select functions may then be scheduled based on the scheduled start time. For example, the AS 806 may begin loading the splicer 804 with the second VC one hour before the scheduled start time and the RAPD 702 may begin retrieving the first VC ten minutes before the scheduled start time. Notably, since it may take more time for the AS 806 to load the splicer 804 with the second VC using a FTP than it may take the RAPD 702 to retrieve the first VC using a VDCP, in one example, the AS 806 may load the splicer with the second VC before the RAPD retrieves the first VC.

However, while select functions may be performed at various times and in different orders, the functions at blocks 910 and 918, namely sending the first and second TSs to the first and second OBDs for simultaneous broadcasting, are performed simultaneously. Notably, use of the term "simultaneously" in this disclosure means at the same time or at substantially the same time and is used to refer to VCs being sent to the OBDs for broadcast during a common time slot. As such, two VCs broadcast generally during the same time slot, but that are slightly offset from each other (e.g., one second or possibly more due to signal processing, etc.) are still considered to be simultaneously broadcast for the purposes of this disclosure.

D. Additional VCs and/or OBDs

While the examples provided above discuss simultaneously broadcasting two VCs, in other examples, three or any other multiple of VCs may be simultaneously broadcast. Such functionality may be provided by adding additional splicers and OBDs to the system 600. Indeed, the encoder 852 may connect to each additional splicer in the same manner as described above (e.g., using additional splitters), and each splicer may be connected to a corresponding additional OBD. Further, the log entry may include additional identifiers (e.g., in additional auxiliary-value fields) that map to corresponding additional VCs for simultaneous broadcast.

In one example, the identifier may also indicate into which splicer the VC is loaded and therefore which OBD should broadcasts the corresponding VC. For example, the AS 806 may identify the splicer 804 and the second OBD 856 based on a prefix of the second identifier. This allows a traffic manager or other user to easily create the log entries having multiple VCs that are to be simultaneously broadcast. For example, the traffic manager may create a log entry having a first identifier "ABC111111" in a house-number field, a second identifier "DEF222222" in a first auxiliary-value field, and a third identifier "GHI333333" in a third auxiliary-value field. Based on the prefix ABC, the AS 806 may load a particular splicer in the system (i.e., one connected to a first OBD corresponding to a provider ABC) with the corresponding VC, which then sends it to the first OBD. The AS 806 may do the same with the second and third identifiers such that VCs are simultaneously broadcast to corresponding providers DEF and GHI. Among other things, this may further reduce or eliminate the need for a user to manually monitor and configure the system to simultaneously broadcast VCs.

V. Example Variations

While examples have been described in terms of VCs for use in a television-broadcasting environment, the presently disclosed system and method may also be adapted for use with other multi-user distribution environments, including for example, a radio-broadcasting environment. Like a television-broadcasting system, a radio-broadcasting systems also include a traffic system (that also create traffic logs with log entries having house-number and auxiliary-value fields), and other entities that parallel those in a television-broadcasting system. However, radio-broadcasting system supports audio, but not video. Therefore, radio-broadcasting systems may be adapted for use with audio-components (AC) rather than VCs. As a result, select entities and/or functions and described throughout this disclosure may be adapted accordingly. For example, the encoder 852 may generate a first data stream (DS) that includes a first AC a (rather that a first TS that includes a first VC in the television environment). Then, the splicer 804 may generate a second DS that maintains the continuity of the generated first DS, but that includes a loaded second AC instead of the first AC.

Notably, the term MC may refer to either an AC or a VC. In another example, the presently disclosed system and method may be adapted for use with an Internet-broadcasting environment (e.g., an environment in which MCs are broadcast over IP to end-user devices). The term broadcast as used in this disclosure also includes multicast.

While one or more functions of the presently disclosed method have been described as being performed by the certain entities (e.g., the AS 808), the functions may be performed by any entity, such as those included in the system 600 described above. Also, not all functions need to be performed to achieve the desired advantages of the presently disclosed method, and therefore not all functions are required.

Further, while examples have been described in terms of select embodiments, alterations and permutations of these embodiments will be apparent to those of ordinary skill in the art. For example, the use of logical structures including condition statements can be modified, interchanged, or restricted without departing from the presently disclosed system and method. Other changes, substitutions, and alterations are also possible without departing from the presently disclosed system and method in its broader aspects as set forth in the following claims.

The invention claimed is:

1. A method comprising:
   a master-control automation-system (AS) selecting a log entry from a television-broadcast traffic-log, the log entry including (i) a first identifier that maps to a first video-component (VC) and (ii) a second identifier that maps to a second VC;
   responsive to the AS selecting the log entry, a recording-and-playout device (RAPD) retrieving the first VC;
   the RAPD sending the retrieved first-VC to an encoder;
   the encoder generating a first transport-stream (TS) having (i) program-identification (PID) data, and (ii) payload data including the sent first-VC;
   the encoder sending the generated first-TS to a first outbound-broadcast device (OBD) for television-broadcast;
   the encoder sending the generated first-TS to a transport-stream splicer;
   responsive to the AS selecting the log entry, the AS loading the splicer with the second VC;
   the splicer generating a second TS having (i) the PID data of the generated first-TS, and (ii) payload data including the loaded second-VC; and
   the splicer sending the generated second-TS to a second OBD for television-broadcast, simultaneously while the encoder sends the generated first-TS to the first OBD.

2. The method of claim 1, wherein the first identifier is included in a house-number field of the selected log-entry, and the second identifier is included in an auxiliary-value field of the selected log-entry.

3. The method of claim 1, wherein the first VC is different from the second VC, and the first OBD is different from the second OBD.

4. The method of claim 1, wherein the RAPD sending the retrieved first-VC to the encoder comprises the RAPD sending the retrieved first-VC to the encoder via a switching network.

5. The method of claim 4, wherein the AS loading the splicer with the second VC comprises the AS loading the splicer with the second VC using a file-transfer protocol (FTP).

6. The method of claim 1, wherein the AS loading the splicer with the second VC occurs before the RAPD retrieves the first VC.

7. The method of claim 1, further comprising:
   identifying the second OBD based on the second identifier, wherein sending the generated second-TS to the second OBD for television-broadcast comprises sending the generated second-TS to the identified second-OBD for television-broadcast.

8. A method comprising:
   selecting a log entry from a television-broadcast traffic-log, the log entry including (i) a first identifier that maps to a first video-component (VC) and (ii) a second identifier that maps to a second VC;
   generating a first transport-stream (TS) having (i) program-identification (PID) data, and (ii) payload data including the first VC;
   sending the generated first-TS to a first outbound-broadcast device (OBD) for television-broadcast;
   generating a second TS having (i) the PID data of the generated first-TS, and (ii) payload data including the second VC; and
   sending the generated second-TS to a second OBD for television-broadcast, simultaneously while sending the generated first-TS to the first OBD.

9. The method of claim 8, wherein the first identifier is included in a house-number field of the selected log-entry, and the second identifier is included in an auxiliary-value field of the selected log-entry.

10. The method of claim 8, wherein the first VC is different from the second VC, and the first OBD is different from the second OBD.

11. The method of claim 8, wherein generating the first TS comprises an encoder generating the first TS, and generating the second TS comprises a transport-stream splicer generating the second TS.

12. The method of claim 8, further comprising:
   identifying the second OBD based on the second identifier, wherein sending the generated second-TS to the second OBD for television-broadcast comprises sending the generated second-TS to the identified second-OBD for television-broadcast.

13. The method of claim 12, wherein the first identifier is included in a house-number field of the selected log-entry, and the second identifier is included in an auxiliary-value field of the selected log-entry, and wherein identifying the second OBD based on the second identifier comprises identifying the second OBD based on a prefix of the second identifier.

14. A television-broadcasting system comprising:
   a recording-and-playout device (RAPD);
   a switching network;

an encoder, wherein the RAPD is connected to the encoder via the switching network;
a first outbound-broadcast device (OBD) connected to the encoder;
a transport-stream splicer connected to the encoder;
a second OBD connected to the splicer;
a master-control automation-system (AS) connected to the RAPD, the switching network, and the splicer, wherein the AS is configured to (i) select a log entry from a television-broadcast traffic-log, the log entry including (a) a first identifier that maps to a first video-component (VC) and (b) a second identifier that maps to a second VC, and (ii) responsive to selecting the log entry, cause (a) the RAPD to retrieve the first VC, and (b) load the splicer with the second VC;
wherein the RAPD is configured to send the retrieved first-VC to the encoder;
wherein the encoder is configured to (i) generate a first transport-stream (TS) having (a) program-identification (PID) data, and (b) payload data including the sent first-VC, (ii) send the generated first-TS to the first OBD for television-broadcast, and (iii) send the generated first-TS to the splicer; and
wherein the splicer is configured to (i) generate a second TS having (a) the PID data of the generated first-TS, and (b) payload data including the loaded second-VC; and (ii) send the generated second-TS to the second OBD for television-broadcast, simultaneously while the encoder sends the generated first-TS to the first OBD.

15. The system of claim 14, wherein the second identifier is included in an auxiliary-value field of the selected log-entry.

16. The system of claim 15, wherein the first identifier is included in a house-number field of the selected log-entry.

17. The system of claim 14, wherein the first VC is different from the second VC, and the first OBD is different from the second OBD.

18. The system of claim 14, wherein the AS is configured to load the splicer with the second VC using a file-transfer protocol (FTP).

19. The system of claim 14, wherein the AS is configured to load the splicer with the second VC before the causing the RAPD to retrieve the first VC.

20. The system of claim 14, wherein the AS is further configured to (i) identify the second OBD based on the second identifier, and (ii) send the generated second-TS to the identified second OBD for television-broadcast.

21. A method comprising:
a master-control automation-system (AS) selecting a log entry from a radio-broadcast traffic-log, the log entry including (i) a first identifier that maps to a first audio-component (AC) and (ii) a second identifier that maps to a second AC;
responsive to the AS selecting the log entry, a recording-and-playout device (RAPD) retrieving the first AC;
the RAPD sending the retrieved first-AC to an encoder;
the encoder generating a first data-stream (DS) including the sent first-AC;
the encoder sending the generated first-DS to a first outbound-broadcast device (OBD) for radio-broadcast;
the encoder sending the generated first-DS to a transport-stream splicer;
responsive to the AS selecting the log entry, the AS loading the splicer with the second AC;
the splicer generating a second DS that maintains the continuity of the generated first DS, and that includes the loaded second-AC; and
the splicer sending the generated second-DS to a second OBD for radio-broadcast, simultaneously while the encoder sends the generated first-DS to the first OBD.

22. A method comprising:
a master-control automation-system (AS) selecting a log entry from a traffic-log, the log entry including (i) a first identifier that maps to a first video-component (VC) and (ii) a second identifier that maps to a second VC;
responsive to the AS selecting the log entry, a recording-and-playout device (RAPD) retrieving the first VC;
the RAPD sending the retrieved first-VC to an encoder;
the encoder generating a first transport-stream (TS) having (i) program-identification (PID) data, and (ii) payload data including the sent first-VC;
the encoder sending the generated first-TS to a first outbound-broadcast device (OBD) for broadcast;
the encoder sending the generated first-TS to a transport-stream splicer;
responsive to the AS selecting the log entry, the AS loading the splicer with the second VC;
the splicer generating a second TS having (i) the PID data of the generated first-TS, and (ii) payload data including the loaded second-VC; and
the splicer sending the generated second-TS to a second OBD for broadcast, simultaneously while the encoder sends the generated first-TS to the first OBD.

23. The method of claim 22, wherein the RAPD sending the retrieved first-VC to the encoder comprises the RAPD sending the retrieved first-VC to the encoder via a switching network.

24. The method of claim 22, wherein the AS loading the splicer with the second VC comprises the AS loading the splicer with the second VC using a file-transfer protocol (FTP).

25. The method of claim 22, wherein the first OBD comprises an Internet feed.

* * * * *